(12) United States Patent
Carter et al.

(10) Patent No.: US 8,084,873 B2
(45) Date of Patent: Dec. 27, 2011

(54) INDUCED SURFACE FLOW WAVE ENERGY CONVERTER

(76) Inventors: Richard W. Carter, Honolulu, HI (US); R. Cengiz Ertekin, Honolulu, HI (US)

( * ) Notice: Subject to any disclaimer, the term of this patent is extended or adjusted under 35 U.S.C. 154(b) by 426 days.

(21) Appl. No.: 12/348,518

(22) Filed: Jan. 5, 2009

(65) Prior Publication Data

US 2009/0174190 A1    Jul. 9, 2009

Related U.S. Application Data

(60) Provisional application No. 61/010,321, filed on Jan. 7, 2008.

(51) Int. Cl.
  *F04B 35/00*    (2006.01)
(52) U.S. Cl. ............................. 290/42; 290/53
(58) Field of Classification Search .................... 290/42, 290/43, 53, 54
  See application file for complete search history.

(56) References Cited

U.S. PATENT DOCUMENTS

| | | | | |
|---|---|---|---|---|
| 3,064,137 | A | * | 11/1962 | Corbett, Jr. et al. ............. 290/53 |
| 3,870,893 | A | * | 3/1975 | Mattera ........................... 290/53 |
| 4,152,895 | A | | 5/1979 | Wirt |
| 4,170,728 | A | | 10/1979 | Flasck |
| 4,271,668 | A | * | 6/1981 | McCormick ..................... 60/398 |
| 4,279,124 | A | | 7/1981 | Schremp |
| 4,371,788 | A | | 2/1983 | Smith |
| 6,216,455 | B1 | * | 4/2001 | Doleh et al. ..................... 60/398 |

OTHER PUBLICATIONS

Hagerman, G., "Wave Energy Resource . . . ", SEASUN Power Systems, for DBEDT, Final Report (1992).
Graw, K., Lacer No. 1, Leipzig Annual Civ.Engg. Report, Universitat Leipzig (1992).
About WaveMaster, Ocean WaveMaster Ltd., U.K., ref. at http://www.oceanwavemaster.com/about.htm.
Hagerman, G., "Guidelines . . . for Offshore Wave Energy Devices", E21 EPRI, Dec. 22, 2003.

* cited by examiner

*Primary Examiner* — Tho D Ta
(74) *Attorney, Agent, or Firm* — Leighton K. Chong (57) ABSTRACT

A wave energy conversion device that employs a submerged horizontally-aligned structure provided with a central opening formed in a horizontally extending surface, focuses wave induced water-particle motion, resulting in a flow into and away from the central opening, and a turbine is mounted in the central opening to be driven by this flow of water. Preferably the operation of this device occurs in a structural submerged depth of less than one-half wavelength of waves in the region. In a preferred embodiment, the flow through the central opening is bidirectional, and a self-rectifying turbine is used for unidirectional rotation. In an alternative embodiment, unidirectional check valves are used to direct water flow to a unidirectional turbine. Guide vanes are used to direct the flow inward towards the opening and can also be used to induce swirl in the flow field. When constructed axisymmetrically, the device can generate power from waves coming from any direction. The device may have multiple turbines arranged within it, or multiple units can be built into an array for power generation. The device may be mounted on supports fixed to the sea floor for shallow-water applications, or may be a floating submerged structure moored to the ocean floor for deep-water applications.

23 Claims, 8 Drawing Sheets

INDUCED SURFACE FLOW WAVE ENERGY CONVERTER

This U.S. patent application claims the priority filing date of U.S. Provisional Application 61/010,321 filed on Jan. 7, 2008, of the same title and in the name of an inventor in common with the present application.

FIELD OF INVENTION

This invention relates to a device for converting the renewable energy source of water waves into usable energy. In particular, it focuses the wave-induced water particle motion to a water turbine-generator centrally located in the surface of the device to generate electric power.

BACKGROUND OF INVENTION

Many prior wave energy converters employ additional wave-activated mediums such as air (air-turbine) or hydraulic (hydraulic-motor) to produce mechanical motion to drive an electric generator rather than allowing the wave-induced fluid flow to directly turn a water-turbine generator. This incurs additional energy conversion losses before electric power is generated to the grid. The prior devices also typically employ a driven element in direct contact with the waves, experiencing large breaking waves in a rough sea environment and corrosion as exposed to a salt-laden air/water boundary. Air turbines positioned above the water surface are also noisy. Air, as a compressible intermediary mechanism, and being of less density than water, also results in more complex mechanical designs needed to harvest the wave energy. For the same flow rate as water, air as an active medium also requires more surface area to generate the same amount of power as water.

Prior wave overtopping devices generate hydroelectric power by creating a higher surface elevation (head) relative to the still water level. These devices have the disadvantage of not only being in direct contact with the surface waves, but also require a large basin to hold the water. In addition, the head must be maintained or the turbine can run dry. Near-shore surface wave energy converters also have the undesirable consequence of being unsightly when viewed from the shoreline, especially in locations where coastal real-estate is at a premium.

The following are examples of other wave conversion devices for generating electrical energy. In U.S. Pat. No. 4,371,788, and U.S. Pat. No. 4,170,728, the disclosed systems extract wave energy by enabling water particles to move a sail beneath the water. U.S. Pat. No. 4,279,124 disclosed the use of propellers mounted on a submerged support which are turned by waves to extract energy. A device called the "Bristol Cylinder" developed by Dr. D. Evans employed a large submerged cylindrical concrete mass floating beneath the surface, which can be made to move in a circular fashion when following the wave induced water-particle orbital motion, and hydraulic rams are used to pump high pressure oil to turn an electric generator. For a detailed description, see Hagerman, G., "Wave Energy Resource and Economic Assessment for the State of Hawaii." prepared by SEASUN Power Systems for the Department of Business, Economic Development and Tourism, Final Report (1992). These prior devices have the disadvantages of using intermediary mechanisms for the incoming wave energy, resulting in more complex mechanical designs needed for wave energy conversion.

A wave energy conversion system, described in "About the Development of Wave Energy Breakwaters", by Graw, K., published in Lacer No. 1, Leipzig Annual Civil Engineering Report, Universität Leipzig (1996), employed wave-activated pulsating flow beneath a divider plate to capture wave energy by driving a low-head hydro-turbine also beneath the divider plate. However, this type of device utilized only wave-induced flow below the divider plate and did not make use of the significant wave-induced flow above and through a surface. The orientation of its hydro-turbine for power generation was also more dependent on the incident wave direction.

Another type of device called the "WaveMaster" wave energy converter, developed by Ocean WaveMaster Ltd., of Manchester, U.K., employed a submerged surface to capture wave energy through multiple one-way valves creating zones of high and low pressure water that flows through turbines within the structure. However, the WaveMaster converted wave energy only across the structure and not through or beneath the surface. The one-way valves used result in power being generated on only one-half of the wave cycle. Debris that may accumulate due to flow through the downward check-valves can also be an operation or maintenance concern.

SUMMARY OF INVENTION

In accordance with the present invention, a wave energy conversion device employs a submerged horizontally-aligned structure provided with a central opening formed in a horizontally extending surface thereof for inducing water-particle motion in a flow into and from the central opening formed in the horizontally extending surface of said submerged structure, and a turbine mounted in the central opening which is driven by the flow of water through the central opening.

Preferably, the structure is submerged within a distance of one-half wavelength of waves in the region. Water-particle motion beneath a wave results in water being forced up through the central opening when the wave is moving from its trough to its crest, and being forced down through the central opening when the wave is moving from a crest to a trough. The horizontal surface of the submerged structure constricts wave-particle motion to produce longer horizontal orbits resulting in increased horizontal flow, which results in a higher horizontal velocity over the surface of the structure. Guide vanes may be used to direct the water flow towards the central opening and can also be used to induce swirl in the flow.

The wave energy converter device can be configured with a surface length to operate at an optimum in a range of wavelengths and wave periods. The device may be made multidirectional when constructed axisymmetrically. It can have multiple turbines arranged within it, or multiple units can be built into an array for power generation. Its submerged design allows it to operate in a harsh ocean environment due to its positioning below breaking waves on the ocean surface and beneath the salt-laden air/water boundary. It is also not visible from the shore. The device may be mounted on supports fixed to the sea floor for shallow-water applications, or may be a floating submerged structure moored to the ocean floor for deep-water applications.

In a preferred embodiment, the flow through the central opening is bidirectional, and a self-rectifying turbine is used that has a unidirectional rotation when subjected to the bidirectional flow of water. The turbine is coupled directly or through a gearbox to an electric generator, and can generate electricity on both halves of the wave cycle. In an alternative embodiment, one-way check valves rectify the bidirectional wave-induced flow into unidirectional flow through the turbine.

Other objects, features, and advantages of the present invention will be explained in the following detailed description of the invention having reference to the appended drawings.

DETAILED DESCRIPTION OF INVENTION

Figure 1:
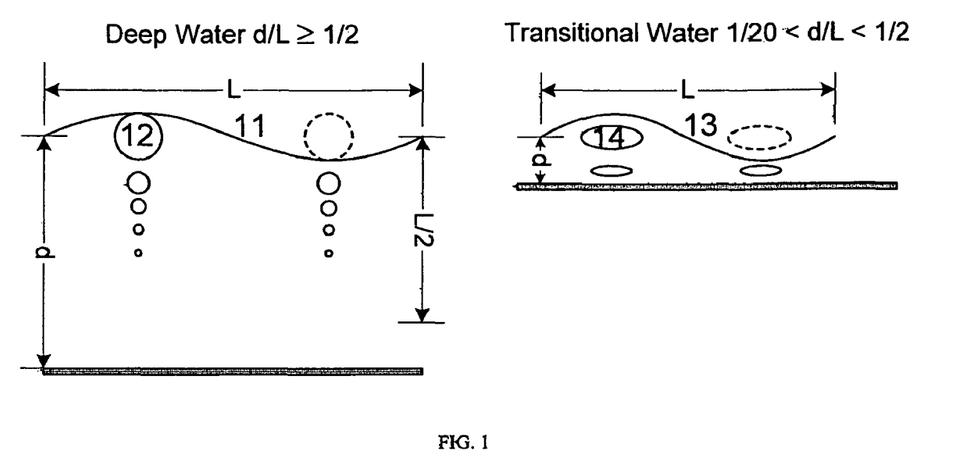
FIG. 1 shows water-particle motion in deep water compared to more shallow (transitional) water.

In FIG. 1, the general nature of wave-induced water-particle motion is illustrated in deep water compared to more shallow (transitional) water. For a wave 11 in deep water, where the water depth d to wavelength L ratio is greater than about 0.5, the water particles oscillate in a circular manner as designated by circles 12. These trajectories decay exponentially with depth and at a depth of ½ the wavelength, the radii of the water-particle orbits are negligible. In shallower depths of transitional water, a wave 13 "feels" the sea floor bottom and the circular orbits become elliptical in nature as designated by ellipses 14.

Figure 2:
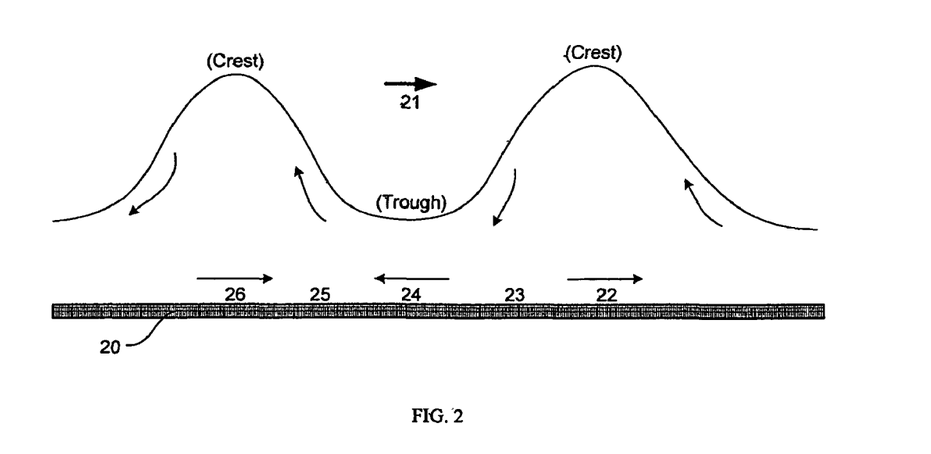
FIG. 2 shows wave-induced water-particle motion over a submerged surface.

In FIG. 2, the wave-induced water-particle motion is exploited using a submerged surface. As a deep-water gravity wave moves over the shallower depth of the submerged surface 20, in the direction from left to right 21, the wave "feels" this surface resulting in an increase in wave height and a reduced wavelength. The deep-water circular orbits of water particles become elliptical in nature, and the shallower the water depth is, the more they become elongated in the horizontal direction. This results in a higher horizontal fluid velocity beneath the wave and across the submerged surface 20. As the wave moves from left to right 21, when observed from a stationary position, the wave motion at the crest of the wave induces horizontal water-particle motion in the direction of the wave, as indicated at numeral 22. As the wave moves from the leading crest to a trough, the water-particle motion is downward, being predominantly in a vertical direction midway between the crest and the trough, as indicated at numeral 23. At the trough, the water-particle motion is horizontal in the direction opposite to the wave, as indicated at numeral 24. As the wave moves from a trough to a following crest, the water-particle motion has an upward movement and is predominantly in a vertical direction midway between the trough and crest, as indicated at numeral 25. At the following wave crest, the water-particle motion is again in the direction of the wave, as indicated at numeral 26.

Figure 3:
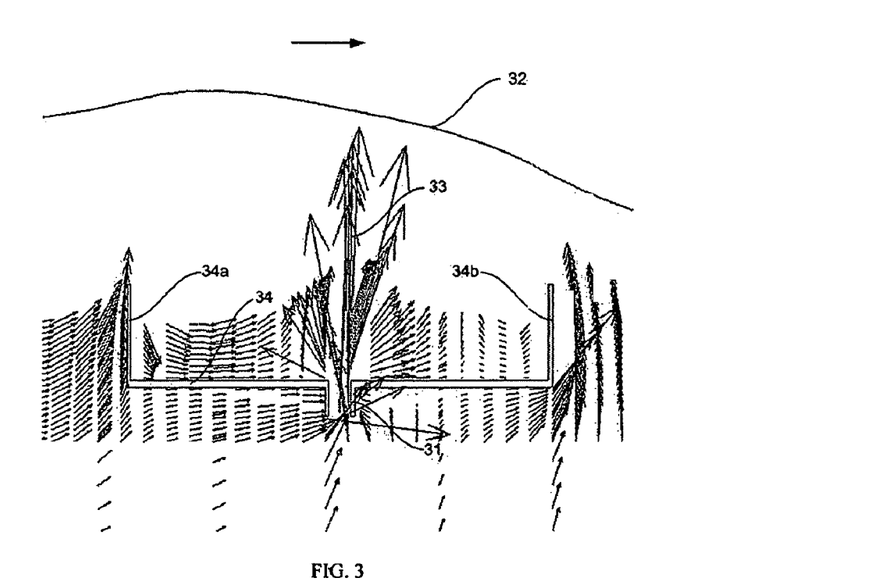
FIG. 3 shows a preferred embodiment of a wave energy conversion device in which wave-induced water-particle velocity vectors are forced upward through a central opening of a submerged structure when a wave is moving from trough to crest.

In FIG. 3, a preferred embodiment of a wave energy conversion device in accordance with the invention is shown directing a wave-induced flow 33 upward through a central opening 31 in a bottom surface of a submerged structure 34 when a wave 32 is moving from trough to crest. At various selected points in the domain, the resultant magnitude and direction of horizontal and vertical velocities are indicated by the arrows in black. The results were obtained by use of linear potential theory and the boundary-element method. The wave-induced fluid flow is channeled through the central opening 31. As the wave 32 moves over the submerged structure 34, the horizontal and vertical components of the fluid flow beneath the surface wave vary depending on the phasing of the wave. The fluid flow is forcefully drawn up through the central opening 31 from beneath the surface of the structure when the surface wave moves from trough to crest over this region. The wave elevation is near the still water level when maximum flow occurs. Side walls 34a, 34b are provided on opposite sides of the bottom surface of the structure 34 to concentrate the flow. This extends the path of the fluid, flowing through the opening rather than passing over the ends of the surface.

Figure 4:
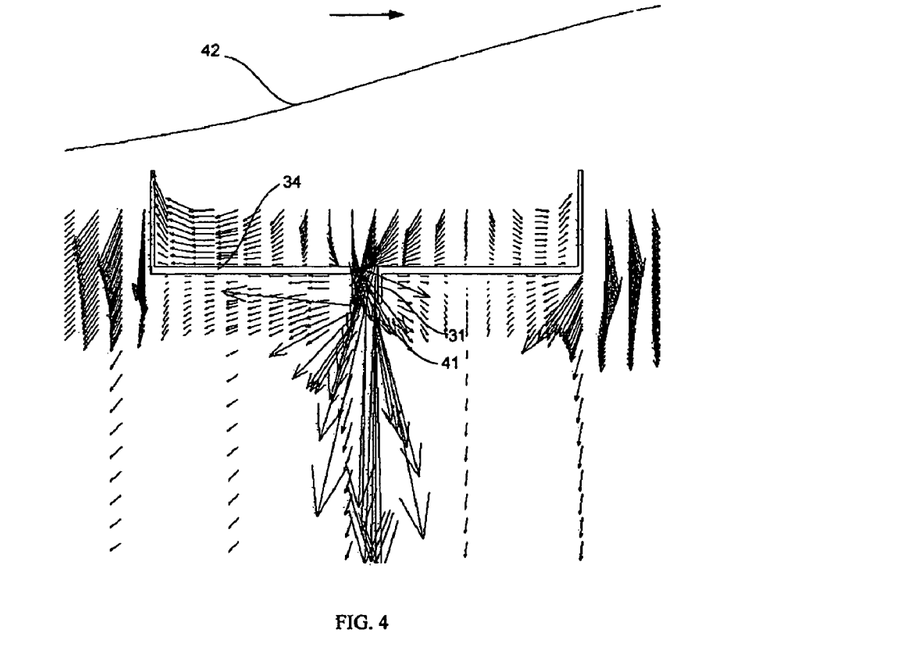
FIG. 4 shows the wave-induced water-particle velocity vectors are forced downward through the central opening of the structure when the wave is moving from crest to trough.

FIG. 4 conversely shows the maximum wave-induced flow 41 being channeled downward through the central opening 31 of the structure 34 when the wave 42 is moving from crest to trough.

Figure 5:
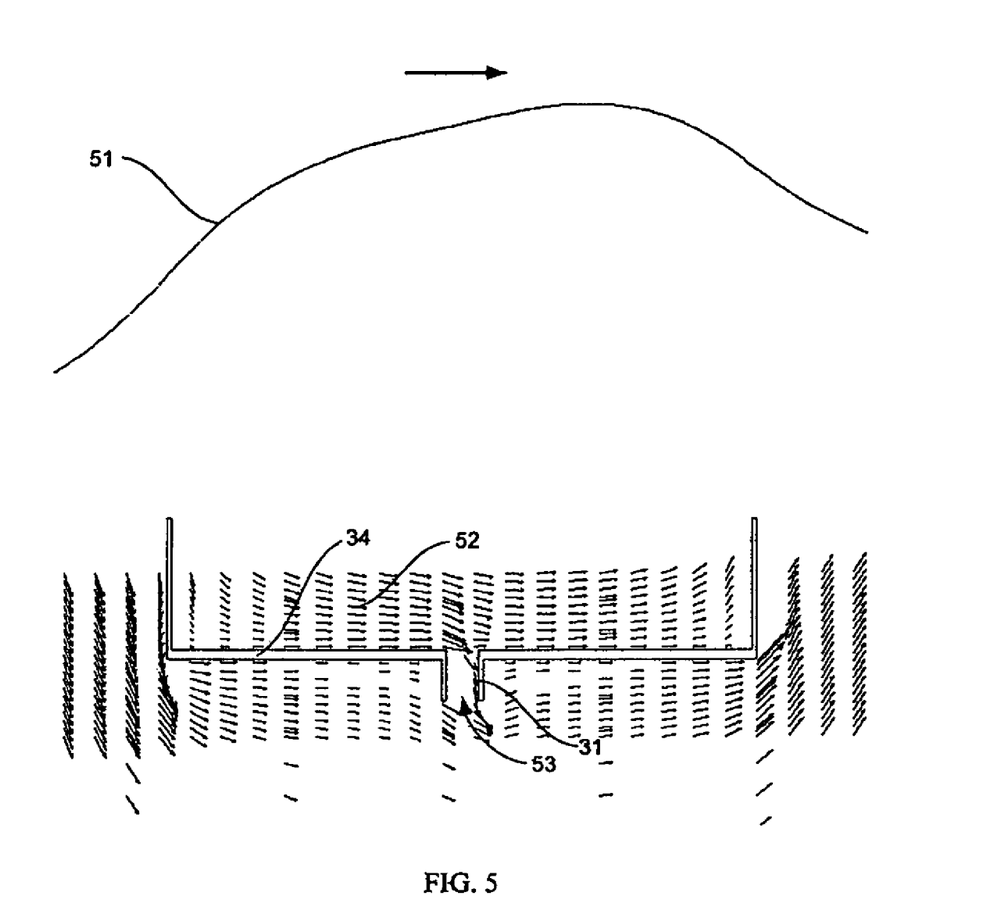
FIG. 5 shows the wave-induced water-particle velocity around the structure when the wave is at the crest.

FIG. 5 shows wave-induced flow around the structure when the wave is at the crest. The wave 51 is at a crest over the structure 34, and the horizontal fluid flow 52 is predominantly in the direction of the wave. Conversely, when the wave trough is over the structure 34, the horizontal flow will be predominantly in the direction opposite that of the wave. At these positions in the wave cycle, minor flow occurs through the central opening 31, as indicated by the arrow 53.

As the wave-induced water particles impart energy to the water turbine, energy is removed from the incident wave. In doing so, the wave height is reduced in the down-wave direction. As a result, a calmer area is created in this region that can be of benefit, for example, in reducing coastal erosion.

Figure 6A:
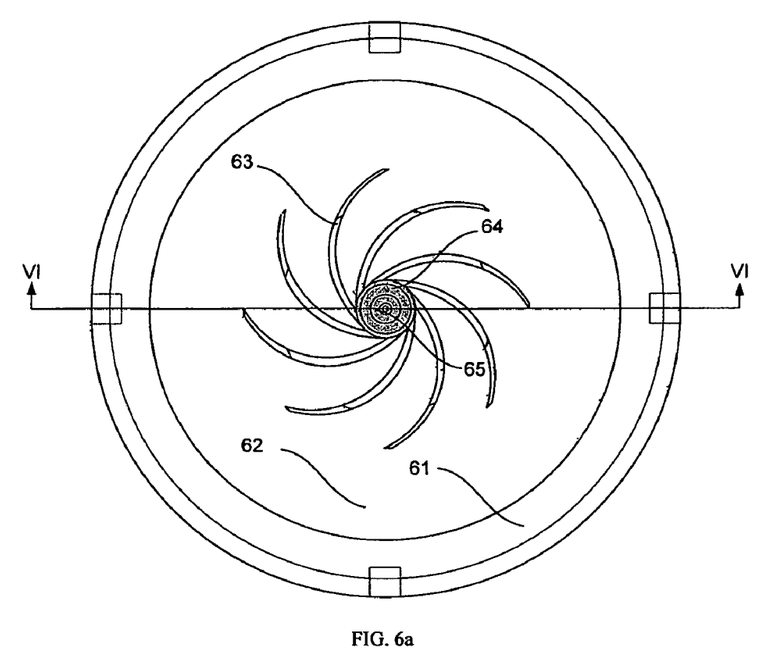
FIG. 6a shows a conceptual top view of the structure illustrating outer and inner guide vanes.

In FIG. 6a, a conceptual top view of the wave energy conversion structure shows an outer rim 61 as side walls around a bottom surface 62 of the structure. Curved outer guide vanes 63 are placed above and below the surface near the central opening. These direct the energy of both the horizontal and vertical particles inward towards the opening, which will increase the velocity of the water particles, imparting more energy to rotate the turbine blades 65. More net flow through the opening will therefore result over the wave cycle. Inner guide vanes 64 are provided above and below the turbine to farther direct the flow to the turbine blades 65. Other guide vane configurations are described further below.

Figure 6B:
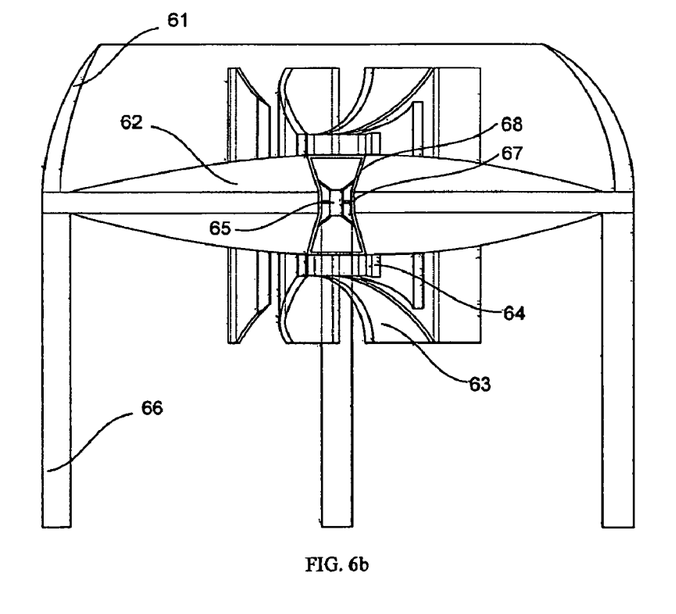
FIG. 6b shows a conceptual sectional side view of the structure illustrating the outer guide vanes, inner guide vanes, turbine enclosure and conical shaped surface.

FIG. 6*b* shows a sectional side view of the wave energy conversion structure taken along the view lines VI-VI in FIG. 6*a*. This embodiment shows a shallow-water configuration in which the structure is raised on supports 66 above the sea floor. The supports 66 can be any number and dimension so as to provide a stable structure securely mounted on the sea floor. The side walls (rim) 61 surround the bottom surface 62 of the structure. The bottom surface 62 may have a convex and conical shape to concentrate the fluid flow toward the center. The outer guide vanes 63 are present on upper and lower sides of the conical surface 62 and direct the flow inward toward the inner guide vanes 64. Depending on the turbine used, the inner guide vanes may be optional. The turbine assembly 65 has a tubular center section 67. The walls 68 for the turbine enclosure are shown having a preferred Venturi-shape.

Figure 6C:
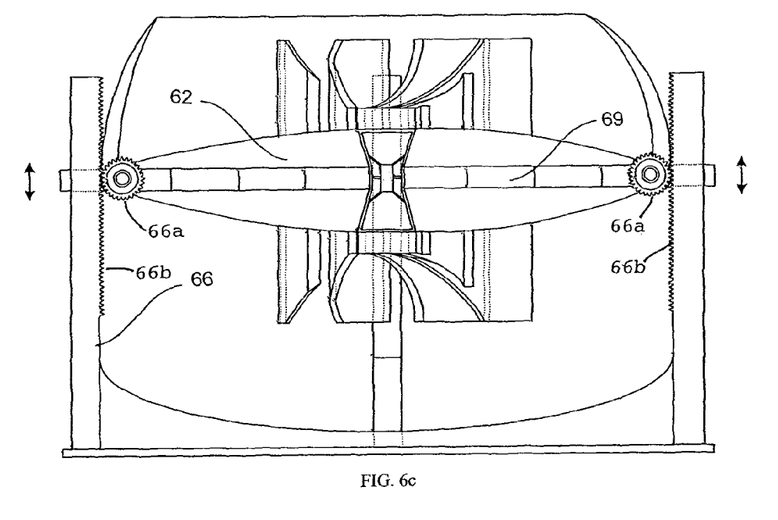
FIG. 6c shows a schematic sectional side view of a modified FIG. 6b structure illustrating the up and down movement of the surface.

FIG. 6*c* shows a preferred configuration where the neutrally buoyant submerged surface 62 is moved up and down by pumping water out of and into ballast chambers 69. The conical surface 62 can be filled with a buoyant material and/or sectioned off with ballast chambers. The vertically moveable surface 62 is kept in position by the fixed supports 66 and mechanical controls such as drive gears 66*a* engaged with gear racks 66*b*. The up and down motion could also be done with screws and/or hydraulic action. The ballast arrangement requires the least maintenance due to less chance of biofouling of the mechanism. The surface is clamped into position when it at the desired location, providing further stability to the overall device. It is unclamped when the surface is to be moved.

In the preferred embodiment, a self-rectifying turbine is used that can rotate in one direction when subjected to a bidirectional flow of water. An example of such a self-rectifying turbine is offered commercially by Clean Current Power Systems Incorporated, of Vancouver, British Columbia, Canada (http://www.cleancurrent.com/technology/design.htm). The turbine is coupled directly or through a gearbox to an electric generator, and can generate electricity during both halves of the wave cycle. Installing this assembly vertically into the surface opening would require placing it in an upright position. Zero-head turbines are often constructed with a Venturi-shaped housing, further facilitating the implementation of these devices in this application. The Venturi-shape constricts the flow, increasing the water-particle velocity to the turbine blades, as well as more readily capturing energy from flow coming at varying angles into the turbine. The tubular center section also channels the flow to the turbine blades. For self-rectifying turbines, the blades are often symmetrical in shape. The propeller-type blade may be more amenable to a rotating fluid flow. An alternator may be incorporated into the design. The generator or gearbox may be mounted either on the top or bottom of the opening allowing flow to occur either beneath or above it.

Figure 7:
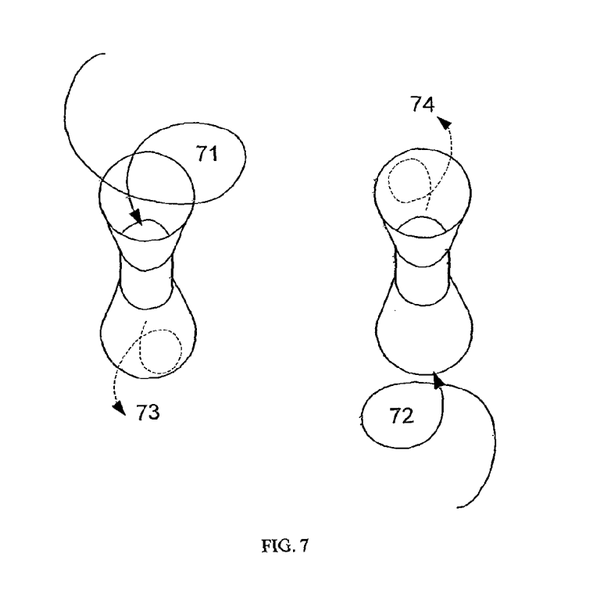
FIG. 7 shows the bidirectional flow through the central opening, rotating counter-clockwise inward and out of the turbine's Venturi-shaped enclosure, and on leaving, the flow is diffused.

FIG. 7 shows the bidirectional flow through the Venturi-shaped turbine enclosure when curved outer guide vanes are used. It illustrates an enlargement of the turbine assembly as previously shown in FIG. 6*b*, 68. The top and bottom outer guide vanes, as shown in FIG. 6*a*, 63 are configured to always induce flow inward in the same direction. For the example shown in FIG. 7, the incoming downward flow 71 exits at 73, while the incoming upward flow 72 exits at 74. All are shown in the counterclockwise direction. On leaving, the flow is diffused (indicated by dashed lines). Depending on the turbine applied, additional inner guide vanes can be placed on the top and bottom of the opening to increase the flow and to improve the efficiency with which energy is captured by altering the angle of attack to the turbine-blades. The vanes can be made fixed or adjustable. These guide vanes can be more amenable to certain types of turbine blade designs than others.

Figure 8:
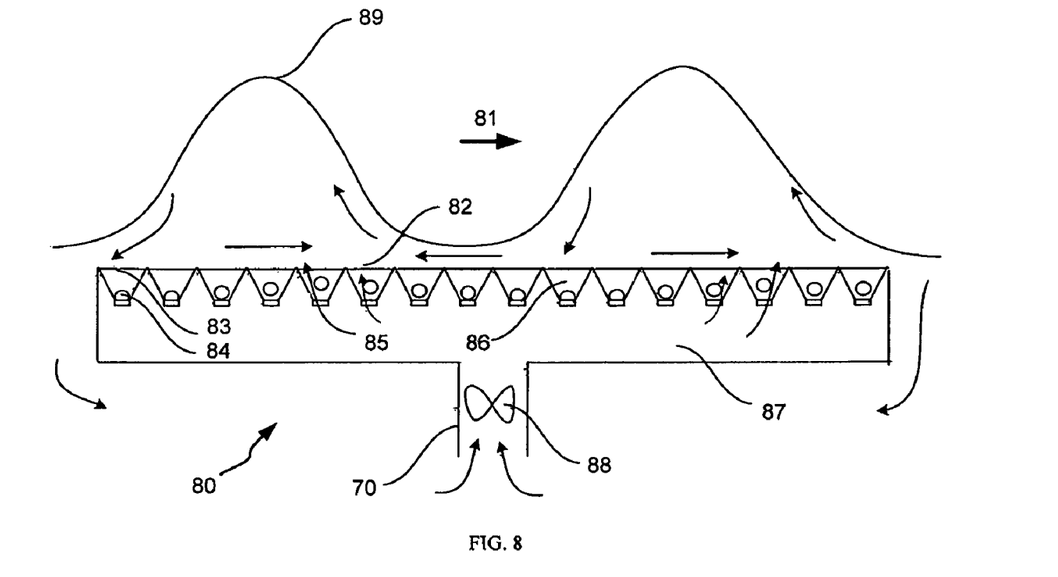
FIG. 8 shows an alternate embodiment of the wave energy conversion device employing one-way check valves that convert bidirectional wave-induced flow into unidirectional flow through the turbine.

FIG. 8 shows an alternate embodiment of the wave energy conversion device employing one-way check valves to convert bidirectional wave-induced flow into unidirectional flow through a more conventional, unidirectional turbine. A progressive wave 89 is shown moving from left to right 81 over a top surface 82 of a submerged structure 80. Holes 83 are formed in the top surface of the structure and the fluid flow through these holes is limited to one direction by one-way valves 84. Fluid is drawn up into the central opening 70 in the bottom opening of the structure 80 when the wave moves from trough to crest 89 over this region, i.e., when the fluid-particle motion is upward. The fluid then flows into the enclosure 87 and out through the check-valves 85. Flow is checked (blocked) in the holes 86 where the flow is downward, occurring when the wave is moving from crest to trough. A unidirectional water turbine 88 is installed in the inlet of the central opening 70 to generate electricity.

To help prevent debris from entering the holes in the top surface, the flow is limited to upward movement, as indicated by arrows 85. The use of check valves will result in the most significant flow through the turbine 88 when the progressive wave's wavelength is greater than the device's surface length. A lesser amount of flow through the opening will also occur when the wavelength is less than the surface length. (This differs from the bidirectional turbine application where the wavelength should be greater than the surface length for significant flow through the turbine to occur. For wavelengths shorter than the surface length, the flow in opposite directions over the surface during a wave cycle can cancel out the net effect through the opening). Examples of suitable unidirectional turbines, such as used for low-head hydro-applications, are the Kaplan turbine and Kaplan bulb-type turbines. The Kaplan turbine is discussed in "Ocean Wave Energy: Current Status and Future Perspectives", by Joao Cruz, in a Springer Series in Green Energy and Technology, 2008, pages 330-335. However, it is noted that if the bidirectional wave-induced flow is rectified for only one direction of flow through the turbine, only one-half of the available power can be harvested and spin-down of the turbine could occur during the non-rectified time period.

Figure 9:
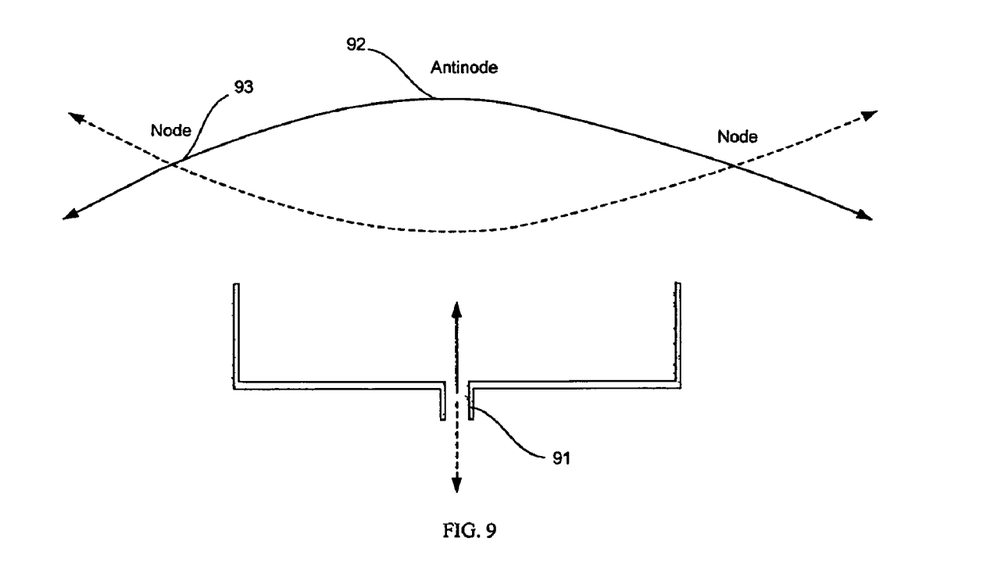
FIG. 9 shows a standing wave application of the wave energy conversion device.

FIG. 9 illustrates a standing wave application of the wave energy conversion device. The device may be used in standing wave applications, such as in basins or harbors, to dampen oscillations and also harvest wave energy. As this type of wave motion is sinusoidal and not progressive, the water particles do not have circular or elliptical orbits. The device would be location dependent, achieving maximum vertical flow through the opening 91 at an antinode 92, while having insignificant or no flow if the opening were located at a nodal position 93.

Figure 10:
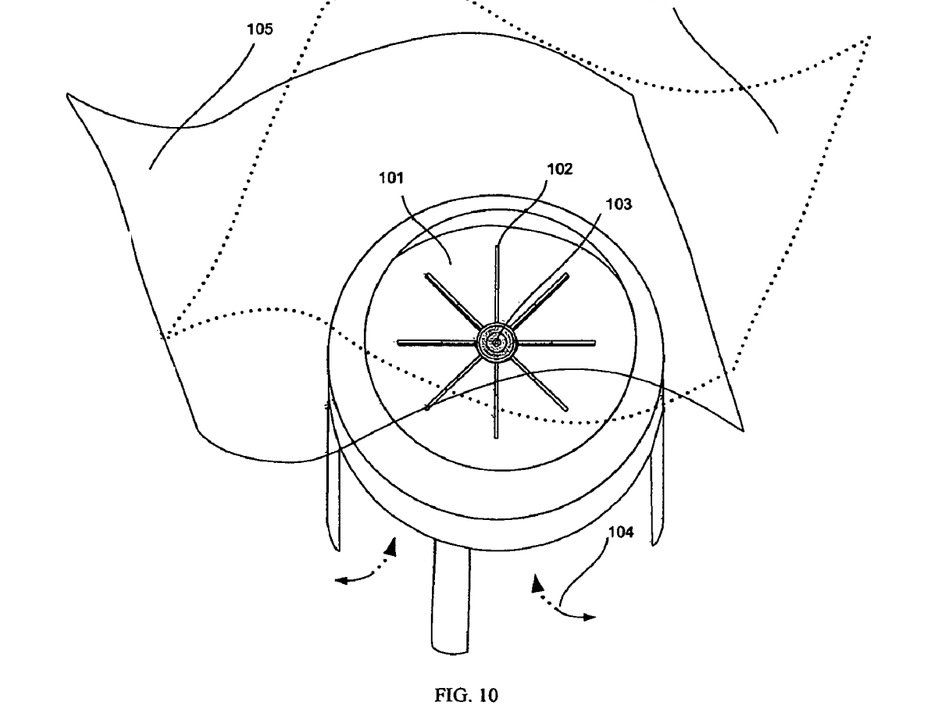
FIG. 10 shows another version of the device with straight outer guide vanes.

In FIG. 10, another configuration for the wave energy conversion device is shown having a circular surface 101 (on support legs for a shallow water environment) with straight outer guide vanes 102 having a funnel inner shape and placed near the opening 103 where the turbine is installed. Bidirectional flow 104 occurs through the opening 103 in the surface. The more axisymmetrical the surface and guides are, the more it can respond to waves coming from any direction, as indicated by the two different wave directions 105 and 106.

Figure 11:
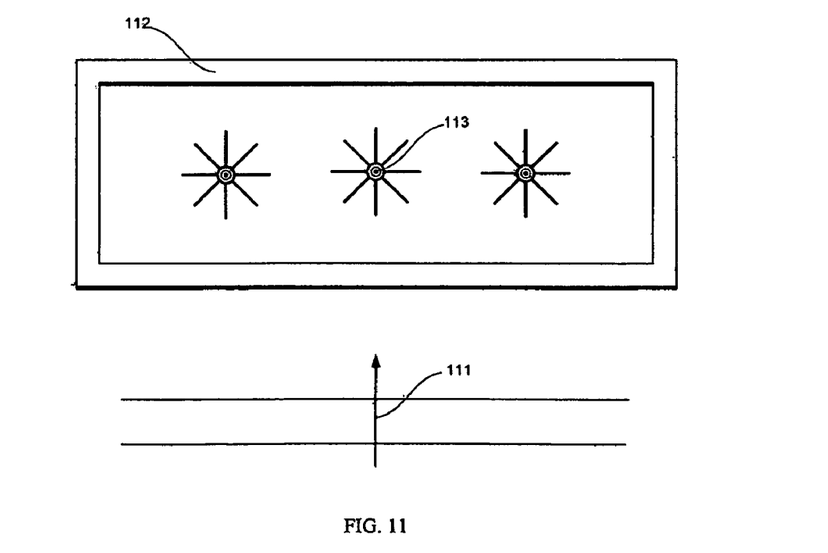
FIG. 11 shows a multi-turbine version of the wave energy conversion device.

In FIG. 11, a multi-turbine version of the wave energy conversion device is shown having a plurality (three) of turbines 113 arranged in a row in a longitudinally extending structure. For coastal installations, the device does not need to be axisymmetrical as the predominant wave direction will be towards shore. The waves are shown moving in the predominant wave direction 111 towards the submerged structure 112. The structure can also act as a submerged breakwater.

Figure 12A:
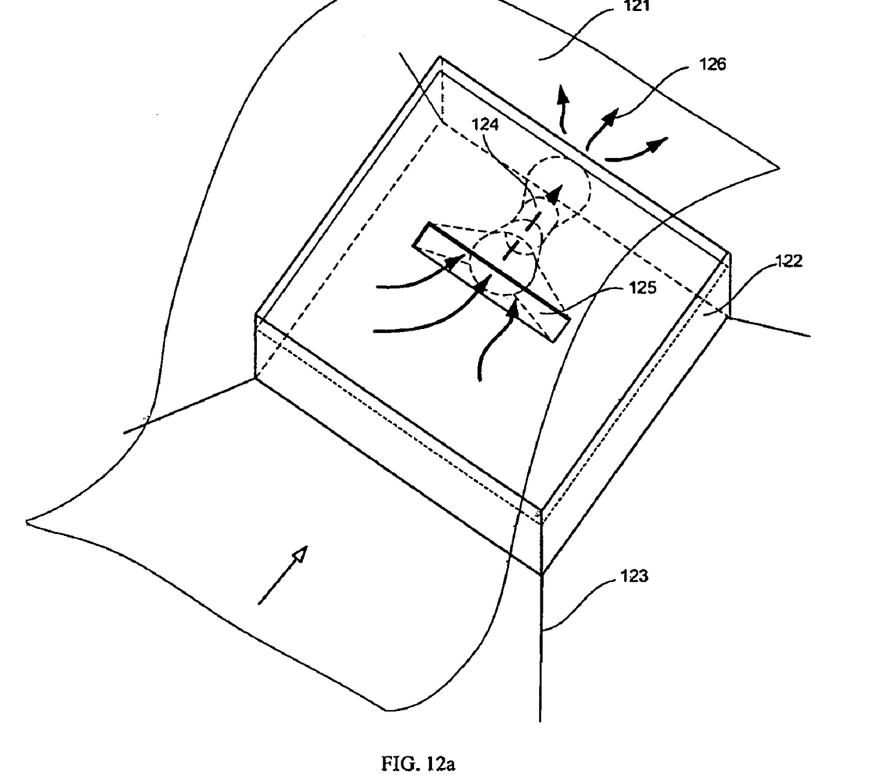
FIG. 12a shows a floating deep-water version of the wave energy conversion device with fixed sides.

FIG. 12a shows a deep-water floating, submerged version of the wave energy conversion device moored or tethered by tie-lines 123 to the ocean floor. The device is oriented toward a predominant wave direction indicated by the arrow for waves 121. A turbine is mounted in a Venturi-shaped surface 124 which may be at an inclined angle or horizontal. For this configuration, when the crest is leading the trough, the wave induced water particles are moving downward into the opening 125 in the surface with side walls 122, passing through the zero-head turbine 124 and then exiting the surface at 126.

Figure 12B:
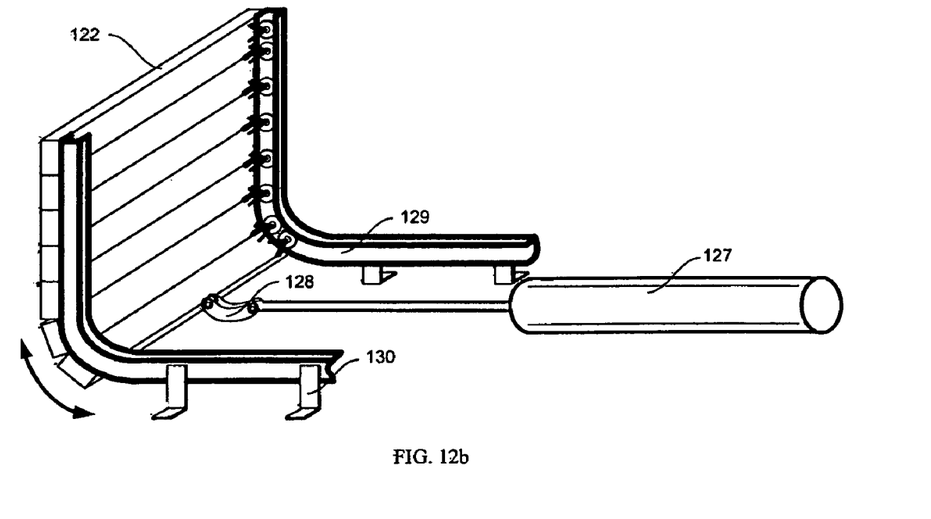
FIG. 12b shows another version of the device with moveable sides, guided by rails mounted on the surface and driven by a hydraulic cylinder.

FIG. 12b shows a version with side walls 122 that are moveable up and down through the action of a hydraulic cylinder 127. Link 128 connects the side walls 122 to the hydraulic cylinder 127. The vertical motion could also be driven by a chain, screw or belt drive. The hydraulic cylinder mechanism is least likely to experience biofouling. Rails 129 guide the up and down motion of the side walls 122. For this configuration, the rails are shown on mounts 130 installed above the surface wherein the side walls slide underneath the rails. Other configurations can have the rails mounted within the surface. The side walls are shown constructed of neutrally buoyant material. If the weight of the side walls is a consideration, a counterbalance can be installed using tension or extension springs.

Multiple wave energy conversion units can be used together to create an array of devices connected to a power grid. Each device can have multiple holes and turbines. The device array can be fixed to the sea floor for shallow-water applications as in FIG. 10, or can be floating submerged structures moored in deep water as in FIGS. 12a and 12b.

The wave climate where the device operates is variable and depends on the location. The flow through the central opening is at a maximum when the length of the horizontally-aligned submerged surface corresponds to the expected length between extremes of wave crest and wave trough. The width of the submerged surface is dependent on the predominant wave direction and can also be larger with an axisymmetrical device. The submergence depth of the horizontally-aligned submerged surface should be no greater than one half of the wavelength of the expected waves on the ocean surface. The selected parameters for configuration of an optimized submerged structure will depend on the average (statistical) wave length and significant wave height at the location that the device will be installed. It will likewise depend on the wave direction if the device is not built axisymmetrically.

The tubular center section, where the turbine resides, helps to align the flow in the direction of the turbine blades. By placing a vertical barrier or circular rim at the sides of the submerged top surface, more wave energy is captured as the flow is directed to the opening rather than flowing over the ends of the surface. The sides may be fixed or regulated by making them moveable up or down to compensate for changes in wave height or tidal variations. Additional structures could be added to focus the wave toward the center opening.

The horizontally-aligned surface of the structure can be made flat, concave or convex. When the shape is convex and conical, it allows the surface wave to bend or refract inward similar to the effect of waves moving around an island. As the depth becomes shallower, the phase speed of the wave decreases, while the period remains the same. The wavelength of the wave must therefore decrease, resulting in a bending of the wavefront (refraction). The orbits follow the direction of the wave and this will place a higher concentration of wave energy at the center opening. This, coupled with the guide vanes, increases flow to the center of the device. The water turbine is placed in the center opening of the surface and can be connected through a gearbox to increase the rotational speed of the generator. A converter can then be placed between the generator and the power grid to compensate for any variance in power flow due to changes in water flow though the turbine.

The outer guide vanes mounted on the surface are placed above and below the opening pointing inward, resulting in an inward directed flow. These fixed vanes can be made either straight or curved and positioned either in a direction orthogonal or at an angle to the center of the opening. Placing them at an angle will induce rotation into the inward moving fluid, turning the fluid either in a clockwise or counterclockwise direction. FIG. 6a shows the wave energy conversion device with curved outer guide vanes 63 placed at an angle to the opening, while FIG. 10 shows straight outer guide vanes 102 orthogonal to the aperture. Curved or straight outer guide vanes can be shaped to form an open inner conical section, allowing the fluid to flow inward with increasing velocity, while on exit, acting as a diffuser, thus decreasing the kinetic energy loss and resulting in more energy being imparted to the turbine blades. With the top and bottom outer guide vanes angled in a similar direction, the flow spirals inward (vortex) into the turbine, rotating in the same direction even though the flow is bidirectional as shown in FIG. 7.

Wave energy is equally composed of potential and kinetic energies. The potential energy is also determined by the variance in wave height while the kinetic energy is due to the motion of the water particles. The total energy of the wave as derived by linear theory is:

$$E = E_{Potential} + E_{Kinetic} = \frac{\rho g H^2 L b}{8}$$

where the density of water is $\rho$, acceleration due to gravity g, wave height H, wavelength L and the crest width b. The energy per unit area is:

$$\bar{E} = \frac{\rho g H^2}{8}$$

showing that for a unit area, the energy to be captured by a wave energy device is dependent on the wave height squared.

Wave power or energy flux, is the rate of change of energy with respect to time. Energy flux is defined as the work done in the horizontal direction by dynamic pressure perpendicular to a vertical section in the direction of the advancing wave. There is a net time-averaged transfer of energy flux in the direction of the wave as the horizontal velocity is in phase with the higher crest elevation as compared to that of the lower trough of the wave where the direction of the horizontal velocity is opposite that of the wave direction. For linear theory, the energy flux or power is defined as:

$$P = \frac{\rho g H^2 c_g b}{8}$$

where $c_g$ is the group velocity of the waves. The wave group velocity is given in linear theory by:

$$c_g = \frac{c}{2}\left[1 + \frac{2kd}{\sinh(2kd)}\right]$$

where k is the wave number and c is the phase velocity. In shallow water, the potential energy is equal to the kinetic energy and the group velocity is equal to the phase velocity. The above equations are for regular waves. The waves in the ocean are generally irregular. The power per wave energy device width in kilowatts per meter J is expressed by significant wave height $H_s$ in meters and energy (peak) period $T_p$ in seconds:

$$J \approx 0.42 H_s^2 T_p.$$

For a detailed description, see Hagerman, G., and Bedard, R., "E2I/EPRI Specification: Guidelines for Preliminary Estimation of Power Production by Offshore Wave Energy Conversion Devices.", Electric Power Research Institute Inc. E2I/EPRI-WP-US-001, 2003, and at http://oceanenergy.epri.com/attachments/wave/reports/001_WEC_Power_Production.pdf.

The wave energy conversion structure focuses the energy of the horizontal and vertical water-particle motion into a fluid flow that moves inward towards the opening located in the center of the surface. The fluid then passes through a self-rectifying turbine mounted in this aperture to extract useable energy before exiting from the other side. The device can be constructed with the bi-directional turbine (in the Venturi enclosure) built into the surface.

The inward movement of fluid is primarily due to the opening or openings in the surface. The surface constrains the circular orbits into elliptical orbits (ellipses 14 in FIG. 1) and this restraint is released when the fluid nears the opening, drawing fluid from various directions into a concentrated flow through the opening. This inward flow continues for most of the wave cycle, varying in magnitude dependent on the vertical component of the water-particle velocity. Significant flow results if the wavelength of the progressive wave is longer than the surface length. This flow peaks at a surface length that is between the extremes of the wave crest and trough. As the wavelength becomes longer, the flow through the opening will decrease from its peak value.

The flow is upward, as observed from a fixed point on the surface, when the trough of the wave is leading the crest while positioned over the surface (vectors 33 in FIG. 3). It is downward when the crest is leading the trough (vectors 41 in FIG. 4). In the wave cycle, the maximum vertical water-particle velocity will occur when the wave elevation above the opening is closer to the still water level.

For tidal and air turbine applications, the power due to kinetic energy per unit time is determined by $$P_{KE} = \frac{1}{2}\dot{m}u^2 = \frac{1}{2}(\rho u A)u^2 = \frac{1}{2}\rho u^3 A$$

where the rate of change of mass is $\dot{m}$, the water velocity u and the area A. At 10° C., the density of air is 1.25 kg/m³, while the density of fresh water is 1000 kg/m³ (sea water being slightly denser). Thus at 10° C., water is 800 times denser than air. As mentioned earlier, for the same flow rate as water, air as an active medium requires much more surface area to generate the same amount of power as water.

As mentioned previously, the wave "feels" the bottom at a depth of about ½ the wavelength. For deep water installations, where the depth is greater than ½ of the wavelength, the submergence depth of the surface must be no deeper than ½ a wavelength distance for the device to operate. The deeper the device is submerged, the less flow that occurs through the opening. The wave energy conversion device can be constructed with a buoyant material such that the overall weight of the structure is submerged at the maximum desired design depth, i.e. within the ½ wavelength depth range. Augmenting this with air or water ballast tanks, and varying the amount of air pumped in or the water pumped out, the structure can be raised up to any depth above the ocean surface to achieve the desired submergence depth. The location of the floating device could be fixed in position by mooring it to the ocean floor.

The wave energy conversion device optimally captures energy from waves moving over its surface by operating at a submergence depth no deeper than one-half of the wavelength. By studying wave and tidal conditions for a proposed location, the best submergence depth can be determined. To maximize the flow through the opening, the optimum submerged position can be achieved by enabling the surface as in FIG. 6c and/or sides as in FIG. 12b to move up and down by a control system. This could be done by hydraulic action, such as with hydraulic cylinders, chain, screw or belt action, or raising and lowering the structure by pumping air or water in or out of chambers. By sensing feedback such as wave height, water depth and or power generated by the water turbine, the control can determine the best submergence depth of the surface and or height of the sides. In rough sea conditions, the entire surface or just the sides may be lowered.

To facilitate maintenance, the wave energy conversion device can be raised above the water surface, with its side supports providing a protective area from the wave environment. The turbine can then be worked on directly. The turbine generator assembly can also be designed so that it can be raised up through the opening. To warn ships or boats of the presence of this device, a beacon light could be mounted on a mast attached to the structure and raised high enough above the water surface to be readily visible.

Many zero-head tidal turbines turn at a slower rate or have no blades in the center making them more "fish-friendly" than older hydro-turbines. For turbines that have inlet openings with inner guide vanes, screening could be placed over the guide vanes or across the top rim of the structure to prevent debris from entering this area. As the flow through the device surface opening is bidirectional, any debris that accumulates in one direction will likely be dislodged on the reverse flow. For applications using check valves for unidirectional turbines, the flow is outward through the surface helping to prevent the accumulation of debris in the check valve opening. Surfaces may be coated to reduce biofouling. An electric charge could be used to prevent further build-up if necessary.

When determining the optimum surface length of the device, energy conversion efficiency should be weighed against material, construction and installation costs. It may be more advantageous to design the optimum surface length for wind waves, i.e., waves that have shorter wavelengths than swell. In this way, costs may be reduced if the surface length is made shorter, while the device will continue to function under swell wave conditions.

The advantages of the wave energy converter device of the present invention include:
1) A simple structure which directly applies wave-induced water-particle motion to the turbine without any compressible air column or mechanical motion conversion components as a medium or intermediary;

2) Focusing wave-induced flow through the center opening of the structure reduces cost, by allowing the turbine to be smaller in size, and also simplifies the mechanical design;
3) Robust design can withstand a severe wave environment due to being submerged beneath the waves;
4) Less corrosion when constructed of steel; requires less maintenance as the device is not situated at or above an air/water boundary;
5) Operates over a wide range of wavelengths, and wave heights;
6) Can operate in a multidirectional wave field;
7) Is submerged below the water surface, so it does not detract from the ocean view;
8) Water turbine is not noisy like an air turbine;
9) Can easily be maintained as it uses well-established hydro-technology;
10) Multiple devices can be connected in an array to the power grid;
11) Operates efficiently to convert water-particle movement directly into water turbine generated electric energy;
12) For optimum operation, can control the height of the sides or submergence depth of the structure;
13) The zero head turbine does not run dry as it is always submerged;
14) Reduced wave height in the down wave direction creates a calmer region, which may, for example, reduce coastal erosion, provide a quieter zone, and provide a protected area for ships.

It is to be understood that many modifications and variations may be devised given the above described principles of the invention. It is intended that all such modifications and variations be considered as within the spirit and scope of this invention, as defined in the following claims.

The invention claimed is:

1. A wave energy conversion device to be used in water having surface waves, comprised of a horizontally extending wave conversion structure positioned in the water and having a horizontally extending surface that is completely submerged below and within a depth of about one-half wavelength from a still water level of surface waves that move over said wave conversion structure, said wave conversion structure being provided with a central opening formed in the horizontally extending surface thereof for inducing water-particle motion in a fluid flow into and from the central opening formed in the horizontally extending surface of said wave conversion structure, and a turbine mounted in the central opening which is driven by the flow of water into and from the central opening.

2. A wave energy conversion device according to claim 1, wherein said horizontally extending surface of said wave conversion structure is configured with a length selected for optimum energy conversion for an expected wavelength of waves in the region.

3. A wave energy conversion device according to claim 1, wherein said wave conversion structure is configured axisymmetrically for operation with multidirectional waves.

4. A wave energy conversion device according to claim 1, wherein the horizontally extending surface of said wave conversion structure has a surface shape that is one of the group consisting of: a flat, a concave and a convex surface.

5. A wave energy conversion device according to claim 1, wherein the induced flow of water through said central opening is bidirectional, and said turbine is a self-rectifying turbine that can rotate in one direction when subjected to the bidirectional flow of water.

6. A wave energy conversion device according to claim 1, wherein the induced flow of water through said central opening is controlled by unidirectional check valves to be unidirectional, and a unidirectional turbine is used for the unidirectional flow of water.

7. A wave energy conversion device according to claim 1, wherein said wave conversion structure is provided with multiple openings in the horizontally extending surface and is mounted with multiple turbines respectively therein.

8. A wave energy conversion device according to claim 1, wherein multiple such devices are arranged in an array for multiplied power generation.

9. A wave energy conversion device according to claim 1, wherein said wave conversion structure is mounted on supports fixed to the sea floor for shallow-water applications.

10. A wave energy conversion device according to claim 1, wherein said wave conversion structure is a submerged structure moored to the ocean floor for deep-water applications.

11. A wave energy conversion device according to claim 1, wherein said central opening mounting the turbine is aligned along a predominant wave direction of waves in the region.

12. A wave energy conversion device according to claim 1, wherein said wave conversion structure is configured for standing wave applications.

13. A wave energy conversion device according to claim 1, wherein said wave conversion structure is configured to be non-axisymmetrical and is oriented to respond to waves only in a predominant wave direction.

14. A wave energy conversion device according to claim 1, wherein said central opening of said wave conversion structure is configured to be circular in shape to respond to waves in any direction.

15. A wave energy conversion device according to claim 1, wherein said central opening of said wave conversion structure is configured to respond to waves only in a predominant wave direction.

16. A wave energy conversion device according to claim 1, wherein said horizontally extending surface is movable up and down by mechanical controls.

17. A wave energy conversion device according to claim 1, wherein said wave conversion structure is provided with side walls around the horizontally extending surface for containing the fluid flow therein.

18. A wave energy conversion device according to claim 17, wherein said side walls are movable by mechanical controls relative to the horizontally extending surface.

19. A wave energy conversion device according to claim 1, wherein said wave conversion structure is provided with outer guide vanes around said central opening for directing fluid flow towards said central opening.

20. A wave energy conversion device according to claim 19, wherein upper and lower sets of outer guide vanes are provided above and below the horizontally extending surface around said central opening, respectively.

21. A wave energy conversion device according to claim 19, wherein said wave conversion structure is provided with inner guide vanes within said central opening for directing fluid flow into said central opening.

22. A wave energy conversion device according to claim 19, wherein said outer guide vanes are curved inwardly in one circumferential direction.

23. A wave energy conversion device according to claim 19, wherein said outer guide vanes are straight and symmetrically arranged around an axis of said central opening.

* * * * *